May 29, 1934. F. B. ZWACK 1,960,655
BABY CRIB
Filed Aug. 19, 1932 4 Sheets-Sheet 1
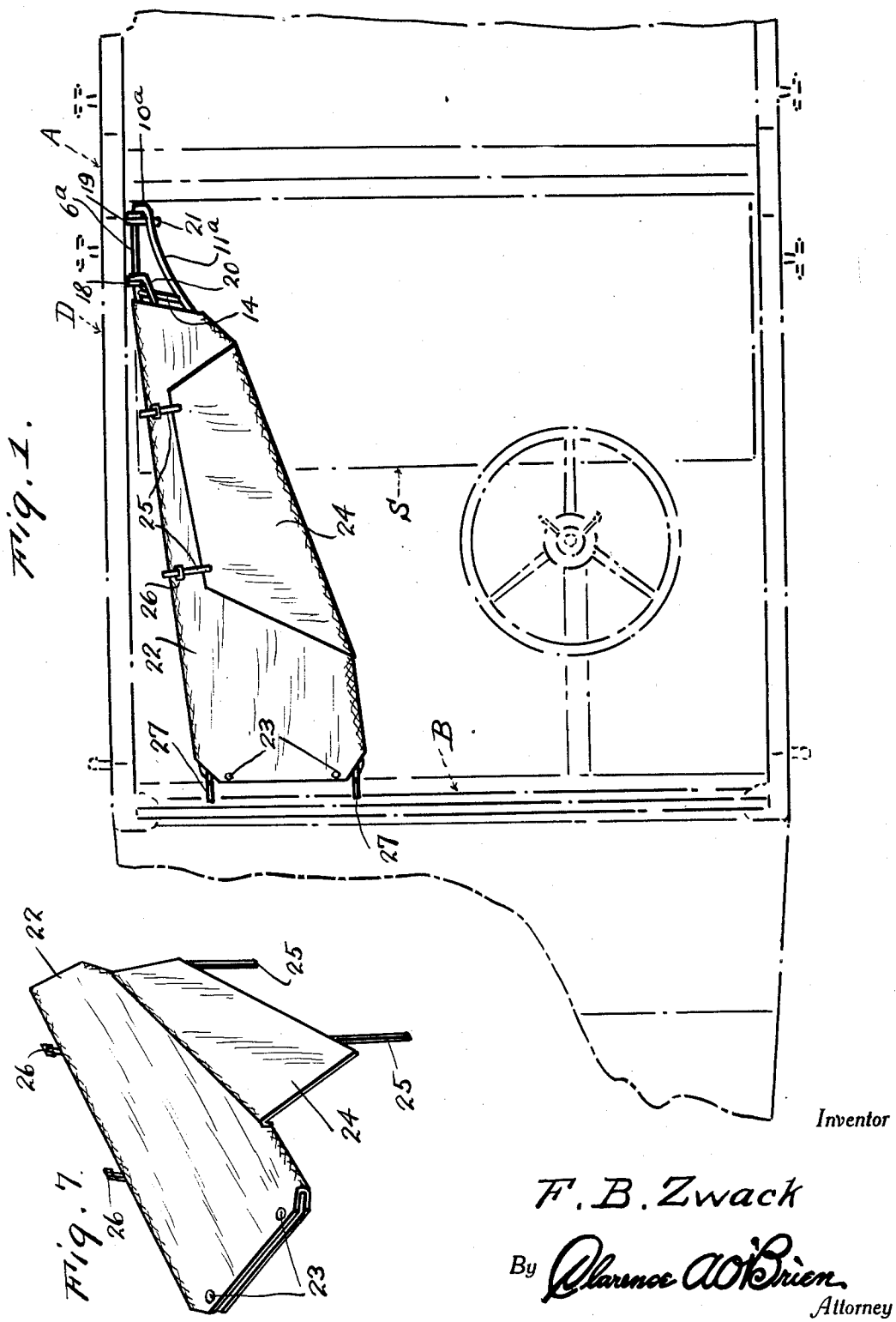
Inventor
F. B. Zwack
By Clarence A. O'Brien
Attorney May 29, 1934.  F. B. ZWACK  1,960,655
BABY CRIB
Filed Aug. 19, 1932   4 Sheets-Sheet 2
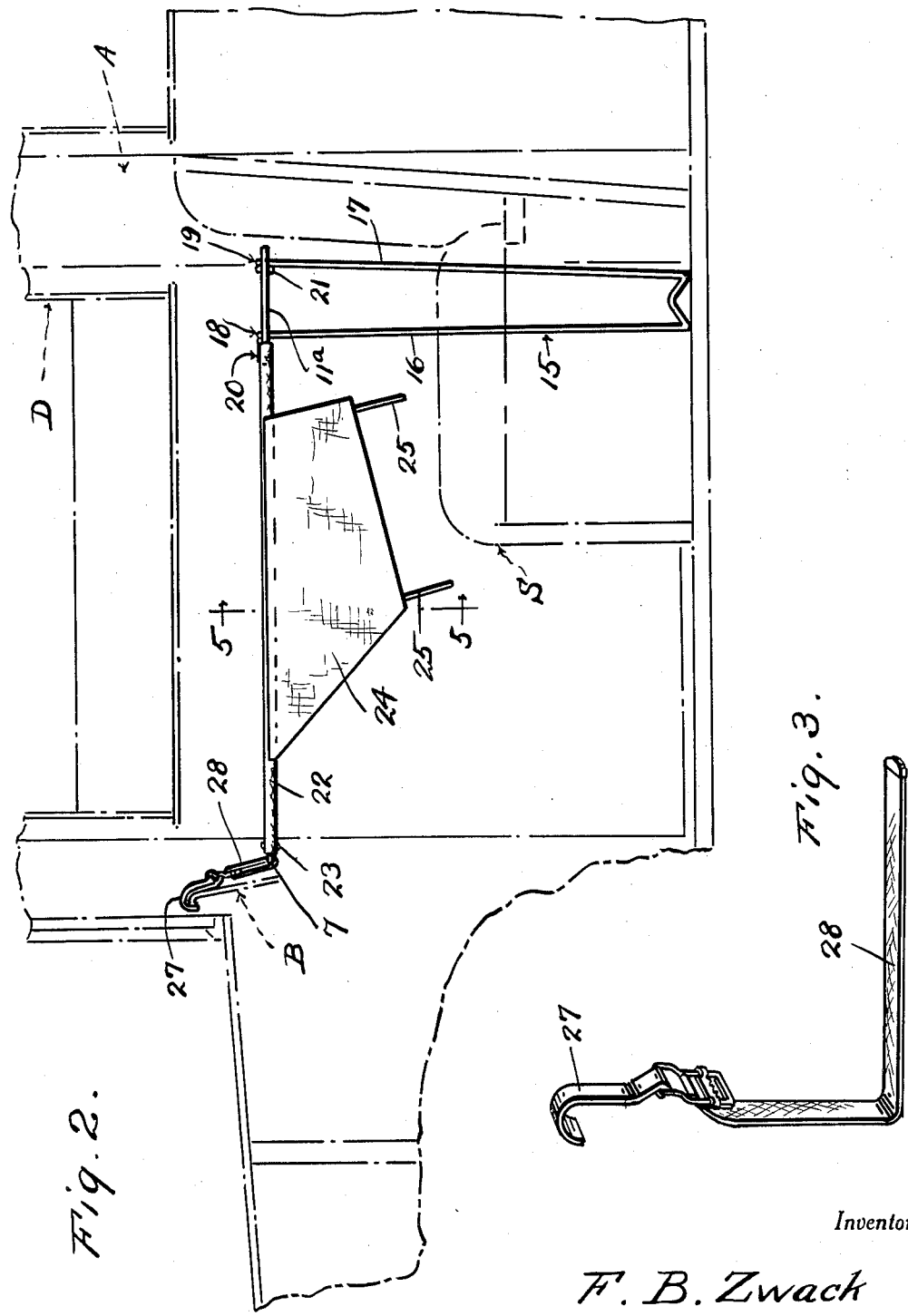
Inventor
F. B. Zwack
By Clarence A. O'Brien
Attorney

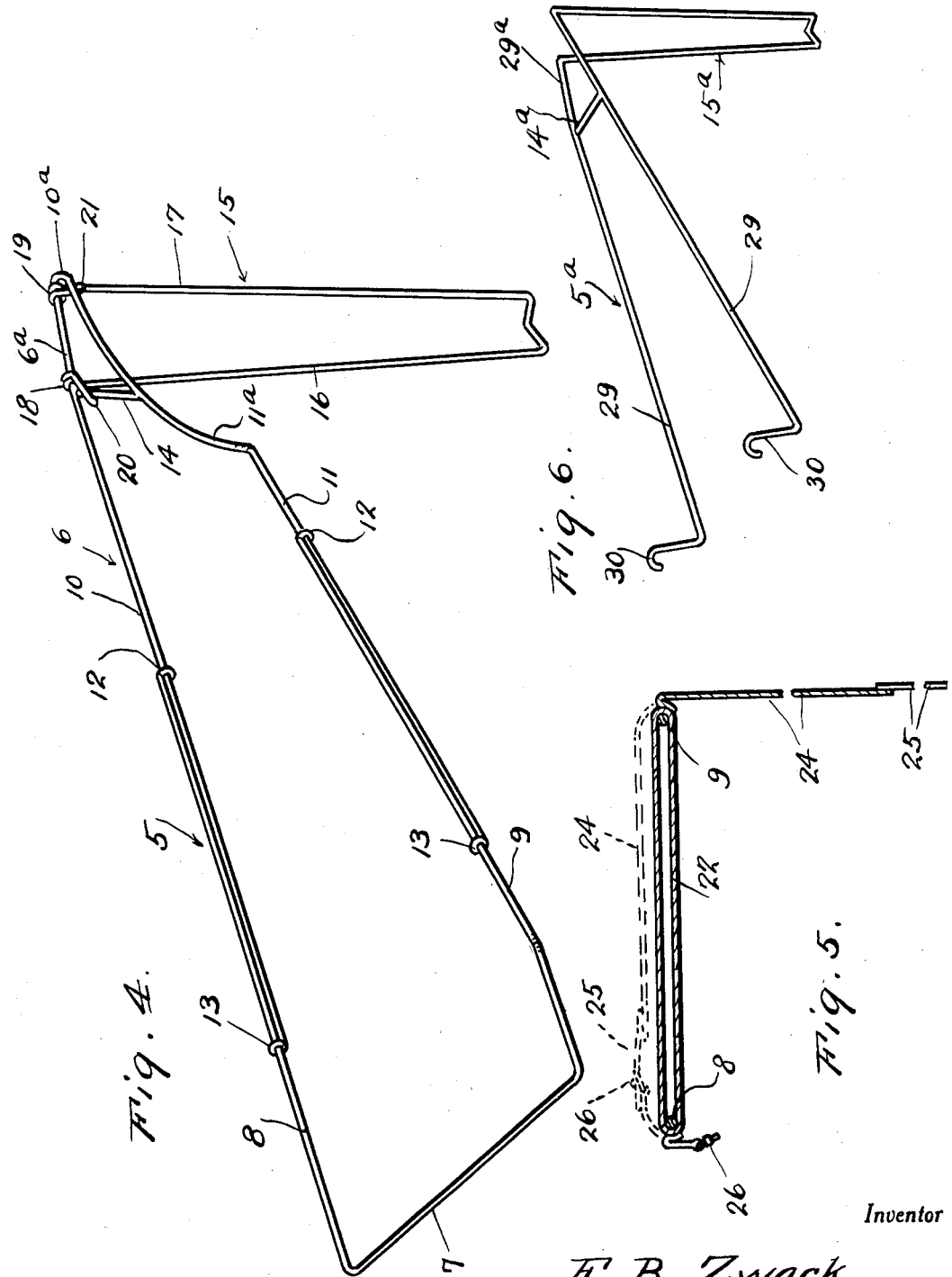

May 29, 1934. F. B. ZWACK 1,960,655
BABY CRIB
Filed Aug. 19, 1932  4 Sheets-Sheet 4
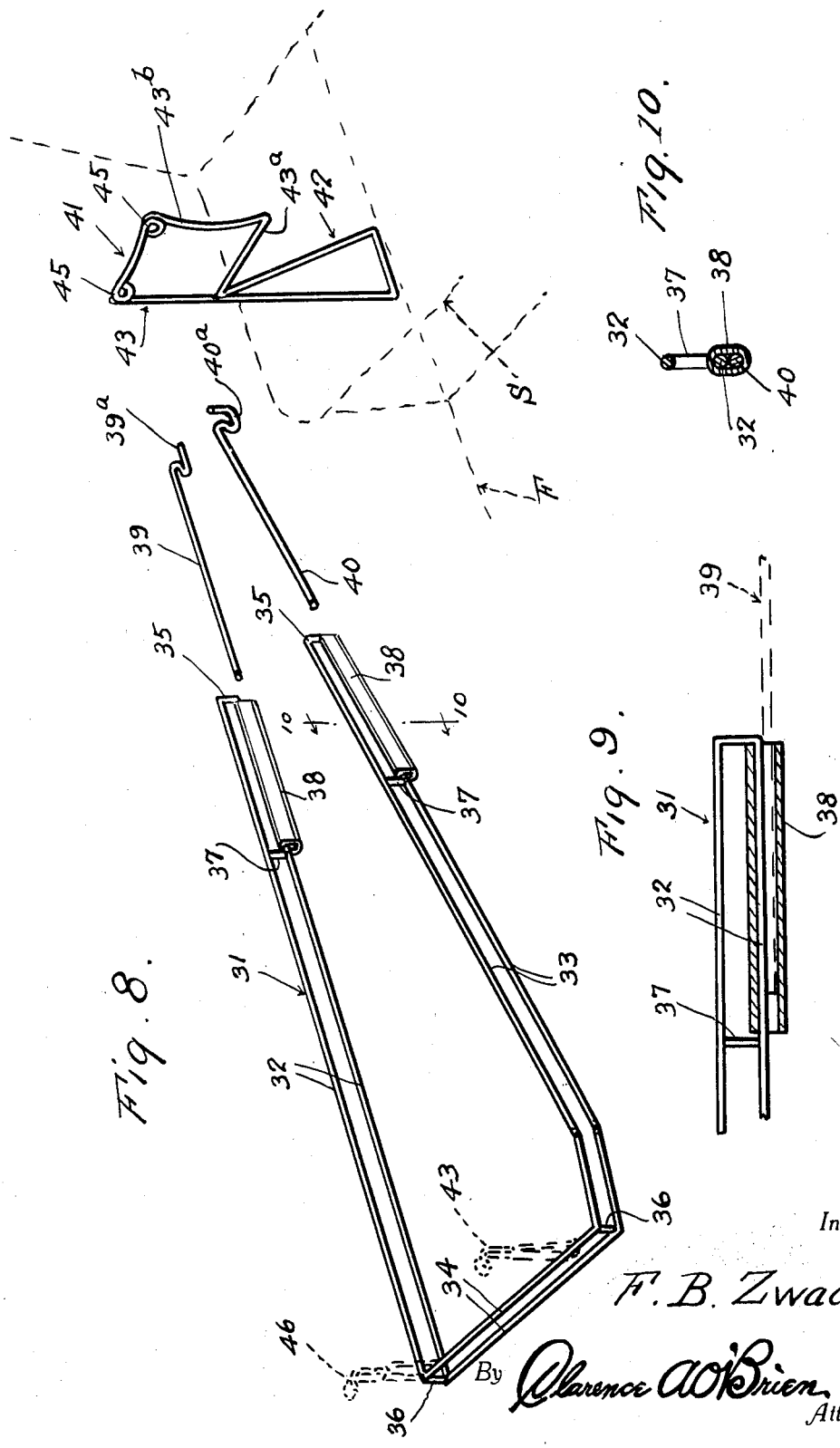
Inventor
F. B. Zwack
By Clarence A O'Brien
Attorney Patented May 29, 1934

1,960,655

UNITED STATES PATENT OFFICE 1,960,655

BABY CRIB

Frank B. Zwack, Cartago, Calif.

Application August 19, 1932, Serial No. 629,552

2 Claims. (Cl. 5—94)

This invention relates to what may be termed a baby crib, and is particularly designed for holding a baby in a comfortable and safe position within an automobile.

In accordance with the present invention a crib for the purpose above suggested is provided especially for use in coupes and similar types of smaller automobiles.

The invention further consists in the provision of a crib of a knock down type, and which when in unfolded position and fully assembled, can be supported within the automobile to hold and comfortably sustain a small child or young baby without inconvenience to the other occupants of the automobile.

The invention together with its numerous objects and advantages will be best understood from a study of the following description, taken in connection with the accompanying drawings wherein:

Figure 1 is a top plan view of the crib, the same being shown arranged within an automobile.

Figure 2 is a side elevational view of the crib with the retaining flap thereof in an unfolded or depending position.

Figure 3 is a perspective view of a suspension hook.

Figure 4 is a perspective view of the crib frame.

Figure 5 is a transverse sectional view taken substantially on the line 5—5 of Figure 2.

Figure 6 is a perspective view of a slightly modified form of frame.

Figure 7 is a perspective view of the fabric bag forming part of the crib.

Figure 8 is a perspective view of still another modified form of crib frame and supporting stand therefor.

Figure 9 is a fragmentary sectional elevational view showing the manner of slidably connecting one side of the crib frame with an extension provided therefor and Figure 10 is a sectional view taken substantially on the line 10—10 of Figure 8 and looking in the direction of the arrows.

Referring more in detail to the drawings it will be seen that the crib briefly, includes a frame provided at one end with a depending supporting leg or stand having its lower end adapted to rest on the floor of the automobile designated generally by the reference character A adjacent that end of the automobile seat S farthest remote from the driver's side of the automobile. At its other end the frame is provided with suitable means for supporting said end from the instrument board B of the automobile. The referred to frame supports a canvas or the like to accommodate the baby and in accordance with the present invention the canvas may be readily removed from the frame, and the support or stand readily folded relative to the frame so that the entire structure is quickly reduced to a relatively small compass and will accordingly require but little storage space.

In the form of the invention illustrated in Figures 1 to 5 inclusive and Figure 7 the frame is designated generally by the reference character 5 and is tapered longitudinally as shown. In this instance the frame 5 is longitudinally adjustable and includes two sections 6, 7 the sections being substantially U-shaped as shown in Figure 4. The sides 8, 9 of section 7 have sliding engagement with the sides 10, 11 of section 6 and in providing a sliding engagement between corresponding sides, it will be seen that I provide the sides 8 and 9 of section 7 at the open end of the U with eyes 12 slidably engaging the sides 10, 11 while said sides 10, 11 at the open side of the U of section 6 are similarly provided with eyes 13 having sliding engagement with sides 8, 9.

Referring more particularly to section 6 of the frame it will be seen that the side 10 thereof as it approaches the closed end of the U is offset as at 6a while the side 11 is connected with the closed end 10a of the U by a curved portion 11a, and the curved portion 11a is braced with respect to the side 10 by an obliquely disposed brace bar 14.

The stand for the frame 5 is designated generally by the reference character 15 and is substantially U-shaped being formed from a single length of wire and the sides 16, 17 of the stand adjacent their free ends are coiled to provide eyes 18, 19 engaging the part 6a of frame section 6 and thereby forming a pivotal connection between the stand 15 and the frame. The eye 18 of side 6 merges into a hook 20 adapted to engage over the bar 14 while the eye 19 merges into a hook 21 adapted to engage under the curved portion 11a adjacent the end 10a, and as is apparent, with the hooks 20 and 21 engaged with the parts 14 and 11a as just described the stand 15 will be supported and secured in a vertical position against casual rotative movement.

Adapted to be supported by the frame 5 is a flexible member 22, and the same is in the nature of a bag open at its ends and while preferably formed of canvas may be formed of netting or any other suitable strong and durable material. The member 22 is adapted to be slipped over the frame in a manner thought apparent so that the member will be held substantially taut between the sides of the frame, and at the widest end thereof the member 22 has its top and bottom portions provided with snap fasteners or other suitable fastening devices 23 so as to prevent untoward longitudinal movement of the bag 22 toward the smallest end of the frame. Fixed or otherwise secured to the bag 22 is a flap 24 preferably of the same material as the member 22 and the flap 24 is adapted to be folded relative to the bag 22 and over the body of the baby so as to comfortably yet securely retain the baby in the crib. The flap 24 is provided with suitable straps 25 adapted to engage the buckles 26 on a relatively opposite side edge of the bag 22 whereby to retain the flap in the position shown in Figure 1.

For supporting the largest end of the frame there may be provided two or more hooks 27 adapted to engage over the upper edge of the instrument board B as suggested in Figures 1 and 2, and each of the hooks is provided with a suitable strap 28 adapted to be suitably engaged with the closed end of the frame section 7.

In actual practice the crib may be set up within the automobile to the right of the driver's seat in the front part of the automobile with the widest end of the crib supported from the instrument board B in the manner just described, and with the stand 15 having its lower end resting on the floor of the automobile and disposed adjacent that end of the seat S farthest remote from the driver to be secured in position between said end of the seat S and the door D of the automobile when the latter is closed whereby the stand will be securely retained against casual displacement. With the crib so supported and positioned, it will be seen that the smallest end of the crib will be disposed over a portion of the seat S and will obviously not result in unduly crowding the occupants of the seat; the body of the person sitting nearest to the crib being accommodated by the curved portion 11a of the frame.

It will thus be seen that the crib will require but minimum space, will offer little or no interference to the occupant of the automobile and will enable a child, especially a baby to be comfortably and conveniently accommodated; and while I have referred to a child as being carried in the crib it is to be understood that the crib can also be used for accommodating a dog or other animal.

In Figure 6 I have shown a slightly modified form of frame and support, and in this form of the invention the frame, the support for the smallest end thereof, and the hooks for engaging the instrument board are all formed integrally and from a single length of wire, the wire being suitably bent to form the longitudinally tapered frame 5a having the sides 29 provided at their diverging ends with hooks 30 to engage over the upper edge of the instrument board. One of the sides 29 is substantially straight throughout its entire length while the other of the sides 29 adjacent the smallest end of the frame is offset inwardly as at 29a and is then continued downwardly to provide one side of the stand 15a; and the first mentioned side 29 is also bent downwardly to provide the other side of the stand 15a. At their converging ends the sides 29 are braced relative to one another by cross bar 14a.

It is apparent that the frame 5a will readily accommodate the bag or member 22 and will support the latter in an expanded or taut condition.

In the form of the invention shown in Figures 8 to 10 inclusive, it will be seen that the crib frame is longitudinally tapered, and comprises a substantially U-shaped part designated by the reference numeral 31. Part 31 may be formed from a suitable length of wire first formed into a loop and then folded upon itself intermediate the ends of the loop to provide a substantial U having sides 32, 33 and end 34. The sides and end each include upper and lower parallel members and these members are connected at the open end of the U as at 35 and at the closed end of the U as at 36. Short pieces 37 connect the upper and lower members of the sides 32, 33 inwardly from the connecting parts 35.

It will also be noted that for the major portion of its length the side 33 is offset inwardly while the side 32 is straight throughout its entire length for a purpose apparent.

Welded or otherwise secured to the lower members of the sides 32, 33 are elongated sleeves 38 disposed adjacent the free ends of the sides 32, 33 between the connecting elements 35, 37. Extensions for the sides 32, 33 are in the nature of rods 39, 40 of suitable length and these rods have telescoping engagement with the sleeves 38 as clearly suggested in Figure 9.

In this latest form of the invention there is also provided a stand or support for the smallest end of the frame, and said stand is designated generally by the reference character 41.

The stand 41 is formed preferably from a single length of wire suitably shaped to provide a substantially triangular post 42 and a substantially rectangular supporting head 43 at the upper end of the post and extending laterally therefrom. At its upper corners the head or supporting part 43 is provided with eyes 45 formed in a manner thought apparent.

In actual practice the leg or post portion 42 of the stand 41 is placed between the door of the automobile and the adjacent side of the seat S so that the base of the foot 42 rests on the floor F of the automobile as suggested in Figure 8. With the stand so arranged it will be seen that the lower horizontal member 43a of the head 43 rests upon the top of the seat S while the laterally disposed vertical side 43b of said head 43 is longitudinally bowed so as to not unduly interfere with a person occupying the seat S.

The extensions 39, 40 are extended outwardly relative to the sides 32, 33 to the extent desired or necessary and the extension 39 at its free end is provided with a return bend and then extended longitudinally as at 39a to provide a pin engageable with one of the eyes 45 while the extension 40 at its free end is formed to provide a substantial U 40a extending laterally of the body of the extension 40 and forming a hook to engage the other of the eyes 45 whereby the frame 41 is suitably connected with the stand 41.

For supporting the largest end of the frame from the instrument board of the automobile there are provided at the end 34 of the frame hooks 46 adapted to engage over the upper edge of the instrument board, and these hooks are connected to the upper member of the end 34 through the medium of straps or in any suitable manner.

Obviously the hooks and straps may be in every detail identical with the hooks and straps shown in Figure 3 and above described.

It is also apparent that the member 22 can be readily placed upon this latest form of frame and will be efficiently supported thereby.

Even though I have herein shown what may be termed the preferred embodiment of the invention, it is to be understood that the same is susceptible of further changes, modifications and improvements coming within the scope of the appended claims.

Having thus described the invention, what I claim as new is:

1. In a device of the character described, a frame, a supporting stand for one end of the frame having a lateral projection provided with a pair of relatively spaced eyes, and means on the sides of the frame at one end thereof engageable with the eyes to provide a quick detachable connection between the frame and said stand.

2. In a device of the character described, an elongated frame open at one end, tubes on opposite sides of the frame adjacent the open end thereof, side rods slidably engaged with said tubes, hooks on one end of said side rods, and a supporting stand for one end of the frame provided with laterally spaced eyes engaging said hooks.

FRANK B. ZWACK.